US012598162B2

(12) United States Patent
Nyamwange et al.

(10) Patent No.: US 12,598,162 B2
(45) Date of Patent: Apr. 7, 2026

(54) SECURE TUNNEL PROXY WITH SOFTWARE-DEFINED PERIMETER FOR NETWORK DATA TRANSFER

(71) Applicant: BANK OF AMERICA CORPORATION, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Shashidhar Phadnis, Charlotte, NC (US); Rahul Yaksh, Austin, TX (US); Hari Vuppala, Concord, NC (US); Pratap Dande, Saint Johns, FL (US); Brian Neal Jacobson, Los Angeles, CA (US); Erik Dahl, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 370 days.

(21) Appl. No.: 18/207,272

(22) Filed: Jun. 8, 2023

(65) Prior Publication Data

US 2024/0414132 A1     Dec. 12, 2024

(51) Int. Cl.
*H04L 9/40* (2022.01)

(52) U.S. Cl.
CPC ........ *H04L 63/029* (2013.01); *H04L 63/0281* (2013.01)

(58) Field of Classification Search
CPC .......................... H04L 63/029; H04L 63/0281
See application file for complete search history.

(56) References Cited

U.S. PATENT DOCUMENTS

| | | |
|---|---|---|
| 8,086,908 B2 | 12/2011 | Zhang |
| 8,650,390 B2 | 2/2014 | Sun |
| 9,825,914 B2 | 11/2017 | Sau |
| 10,050,840 B2 | 8/2018 | Zheng |
| 10,083,055 B2 | 9/2018 | Gupta |
| 10,097,517 B2 | 10/2018 | McElwee |
| 10,893,095 B1 | 1/2021 | Taaghol |
| 10,924,369 B2 | 2/2021 | Nainar |
| 11,102,186 B2 | 8/2021 | Wang |
| 11,190,489 B2 | 11/2021 | Miller |
| 11,206,242 B2 | 12/2021 | Tummalapenta |
| 11,228,519 B1 | 1/2022 | Devarajan |
| 11,315,024 B2 * | 4/2022 | Gil Bulacio ........... G06N 5/025 |

(Continued)

FOREIGN PATENT DOCUMENTS

WO        2019156265 A1     8/2019

*Primary Examiner* — Hee K Song
(74) *Attorney, Agent, or Firm* — Moore & Van Allen PLLC; Nicholas C. Russell

(57) ABSTRACT

Systems, computer program products, and methods are described herein for a secure tunnel proxy with software-defined perimeter for network data transfer. The present disclosure is configured to receive sensor configuration information associated with an Internet of Things (IoT) sensor; receive information associated with an edge computing device configured to receive sensor data from the IoT sensor; configure a secure tunnel proxy between the IoT sensor and the edge computing device based on at least the sensor configuration information and the information associated with the edge computing device; and deploy the secure tunnel proxy between the IoT sensor and the edge computing device.

17 Claims, 6 Drawing Sheets

(56) References Cited

U.S. PATENT DOCUMENTS

| | | | |
|---|---|---|---|
| 11,637,766 B2 | 4/2023 | Devarajan | |
| 11,870,797 B2 | 1/2024 | Chamorro | |
| 11,968,183 B2 | 4/2024 | Narahari | |
| 2018/0084409 A1 | 3/2018 | Rappard | |
| 2018/0288179 A1* | 10/2018 | Bhatia | H04L 67/56 |
| 2019/0098089 A1* | 3/2019 | Shim | H04L 67/12 |
| 2020/0059976 A1 | 2/2020 | Bhatia | |
| 2022/0337654 A1* | 10/2022 | Koenig | H04L 67/561 |
| 2023/0079689 A1 | 3/2023 | Dunbar | |
| 2024/0163301 A1 | 5/2024 | Chamorro | |

* cited by examiner

140

156

162

164

166

152

170

160

158

154

168

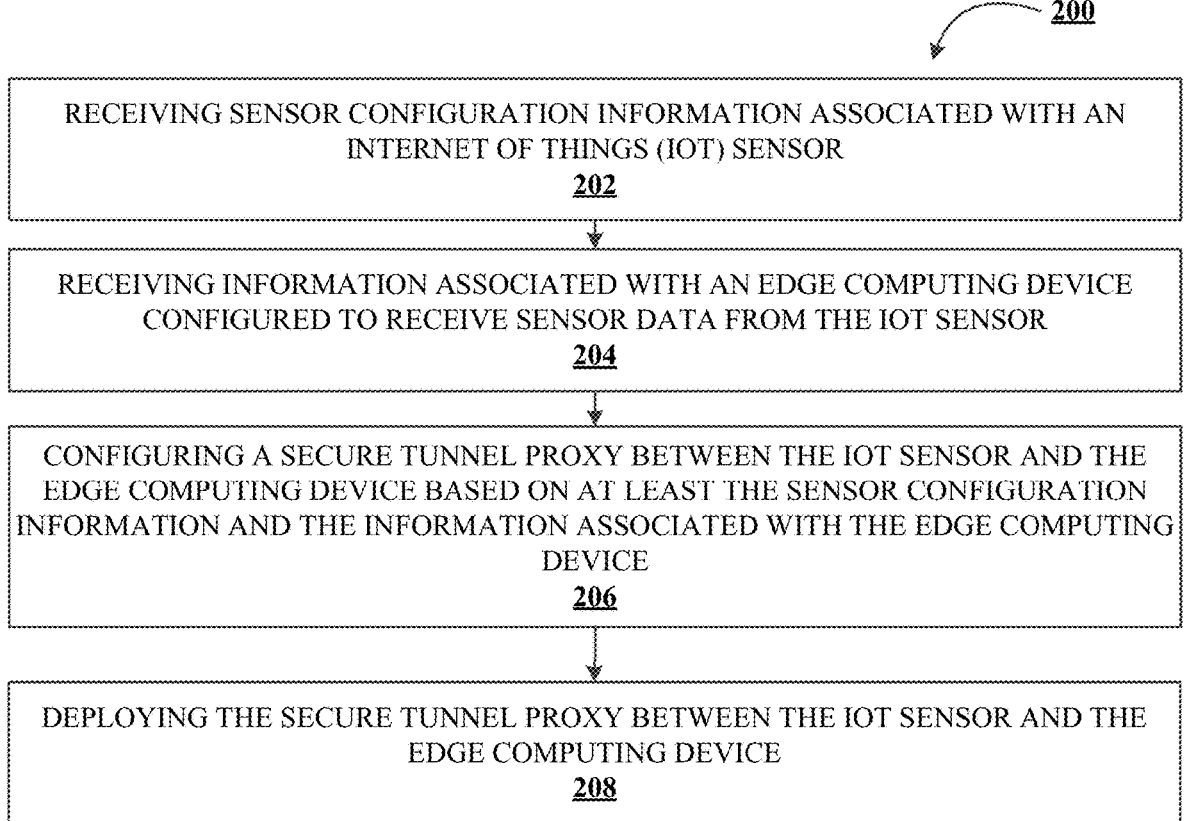

_200_

RECEIVING SENSOR CONFIGURATION INFORMATION ASSOCIATED WITH AN
INTERNET OF THINGS (IOT) SENSOR
_202_

RECEIVING INFORMATION ASSOCIATED WITH AN EDGE COMPUTING DEVICE
CONFIGURED TO RECEIVE SENSOR DATA FROM THE IOT SENSOR
_204_

CONFIGURING A SECURE TUNNEL PROXY BETWEEN THE IOT SENSOR AND THE
EDGE COMPUTING DEVICE BASED ON AT LEAST THE SENSOR CONFIGURATION
INFORMATION AND THE INFORMATION ASSOCIATED WITH THE EDGE COMPUTING
DEVICE
_206_

DEPLOYING THE SECURE TUNNEL PROXY BETWEEN THE IOT SENSOR AND THE
EDGE COMPUTING DEVICE
_208_

RECEIVE A DATA TRANSFER REQUEST FROM THE IOT SENSOR
402

RECEIVE AN INTERNET PROTOCOL (IP) ADDRESS ASSOCIATED WITH THE IOT
SENSOR
404

CONFIGURE THE SECURE TUNNEL PROXY BASED ON THE IP ADDRESS OF THE IOT
SENSOR
406

DEPLOY THE SECURE TUNNEL PROXY
408

CHANNEL SENSOR DATA FROM THE IOT SENSOR TO THE EDGE COMPUTING
DEVICE VIA THE SECURE TUNNEL PROXY
410

SECURE TUNNEL PROXY WITH SOFTWARE-DEFINED PERIMETER FOR NETWORK DATA TRANSFER

TECHNOLOGICAL FIELD

Example embodiments of the present disclosure relate to a secure tunnel proxy with software-defined perimeter for network data transfer.

BACKGROUND

Navigating the vast and complex world of data management from Internet of Things (IoT) devices can be a daunting task. As an ever-growing number of such devices are integrated into large network environments, they continually generate a substantial volume of data. This data is crucial as it supports various vital applications and analytics, playing a significant role in the digital ecosystem.

Applicant has identified a number of deficiencies and problems associated with data security, and in particular, ensuring the safety and integrity of information from each IoT device. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for a secure tunnel proxy with software-defined perimeter for network data transfer.

In one aspect, a system for a secure tunnel proxy with software-defined perimeter for network data transfer is presented. The system comprising: a processing device; a non-transitory storage device containing instructions when executed by the processing device, causes the processing device to: receive sensor configuration information associated with an Internet of Things (IoT) sensor; receive information associated with an edge computing device configured to receive sensor data from the IoT sensor; configure a secure tunnel proxy between the IoT sensor and the edge computing device based on at least the sensor configuration information and the information associated with the edge computing device; and deploy the secure tunnel proxy between the IoT sensor and the edge computing device.

In some embodiments, executing the instructions to configure the secure tunnel proxy further causes the processing device to: assign a first network port to the edge computing device; assign a second network port to the IoT sensor; and configure a secure tunnel between the IoT sensor and the edge computing device using the first network port and the second network port.

In some embodiments, the first network port is identified using a first port number, and the second network port is identified using a second port number.

In some embodiments, executing the instructions further causes the processing device to: assign a proxy for the first network port and a proxy for the second network port; and configure the secure tunnel proxy using the proxy for the first network port and the proxy for the second network port.

In some embodiments, executing the instructions further causes the processing device to: dynamically re-assign the proxy for the first network port and the proxy for the second network periodically.

In some embodiments, executing the instructions further causes the processing device to: receive a data transfer request from the IoT sensor; receive an Internet Protocol (IP) address associated with the IoT sensor; configure the secure tunnel proxy based on the IP address of the IoT sensor; deploy the secure tunnel proxy; and channel sensor data from the IoT sensor to the edge computing device via the secure tunnel proxy.

In some embodiments, the sensor configuration information comprises a device identification, network parameters, security settings, sampling rate, power management, data transmission interval, threshold values, calibration settings, and/or firmware information.

In some embodiments, the information associated with the edge computing device comprises device information, network information, operational status, security information, configuration settings, location data, application and services information, and data analytics.

In another aspect, a computer program product for a secure tunnel proxy with software-defined perimeter for network data transfer is presented. The computer program product comprising a non-transitory computer-readable medium comprising code causing an apparatus to: receive sensor configuration information associated with an Internet of Things (IoT) sensor; receive information associated with an edge computing device configured to receive sensor data from the IoT sensor; configure a secure tunnel proxy between the IoT sensor and the edge computing device based on at least the sensor configuration information and the information associated with the edge computing device; and deploy the secure tunnel proxy between the IoT sensor and the edge computing device.

In yet another aspect, a method for a secure tunnel proxy with software-defined perimeter for network data transfer is presented. The method comprising: receiving sensor configuration information associated with an Internet of Things (IoT) sensor; receiving information associated with an edge computing device configured to receive sensor data from the IoT sensor; configuring a secure tunnel proxy between the IoT sensor and the edge computing device based on at least the sensor configuration information and the information associated with the edge computing device; and deploying the secure tunnel proxy between the IoT sensor and the edge computing device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
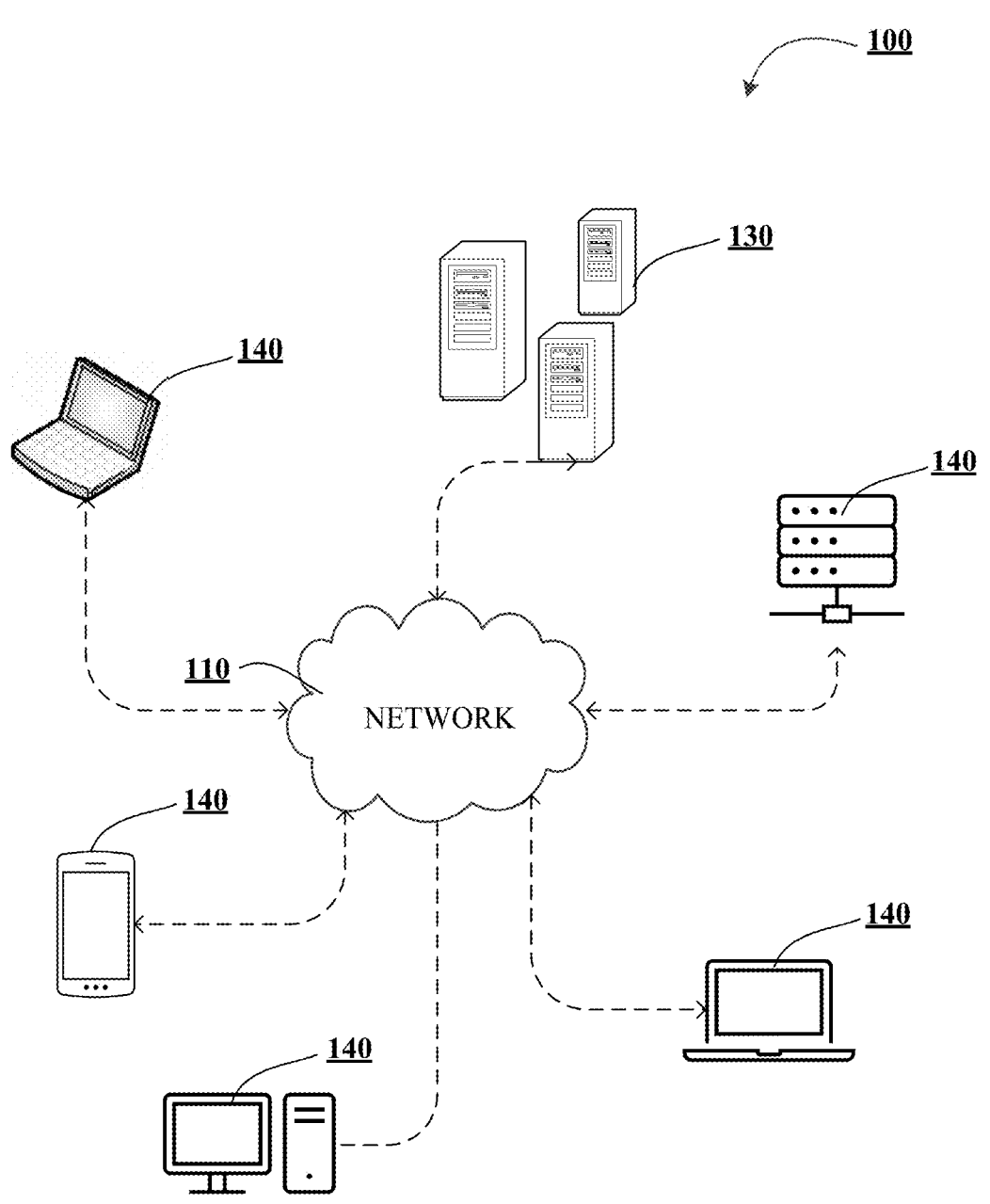
Figure 1B:
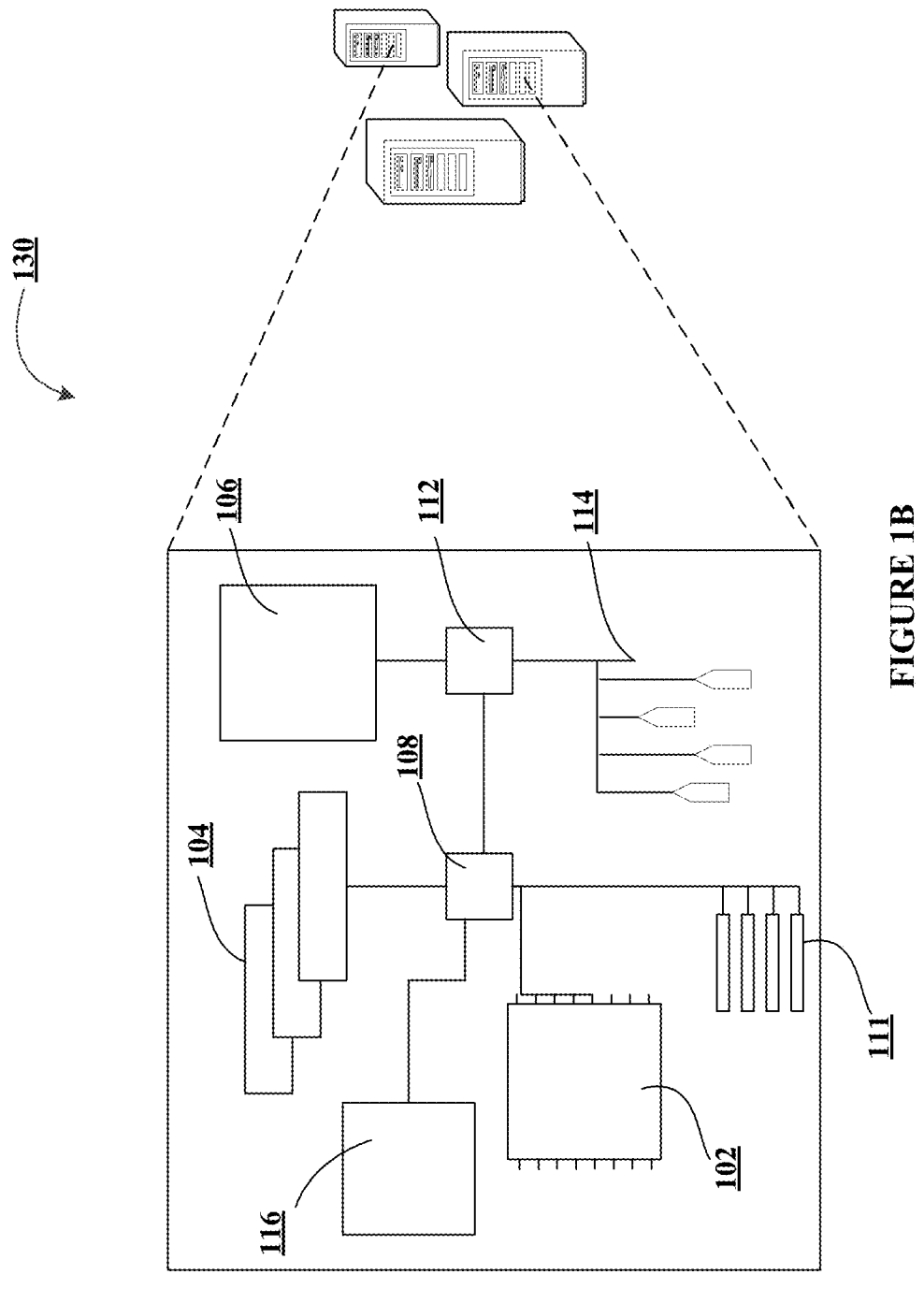
Figure 1C:
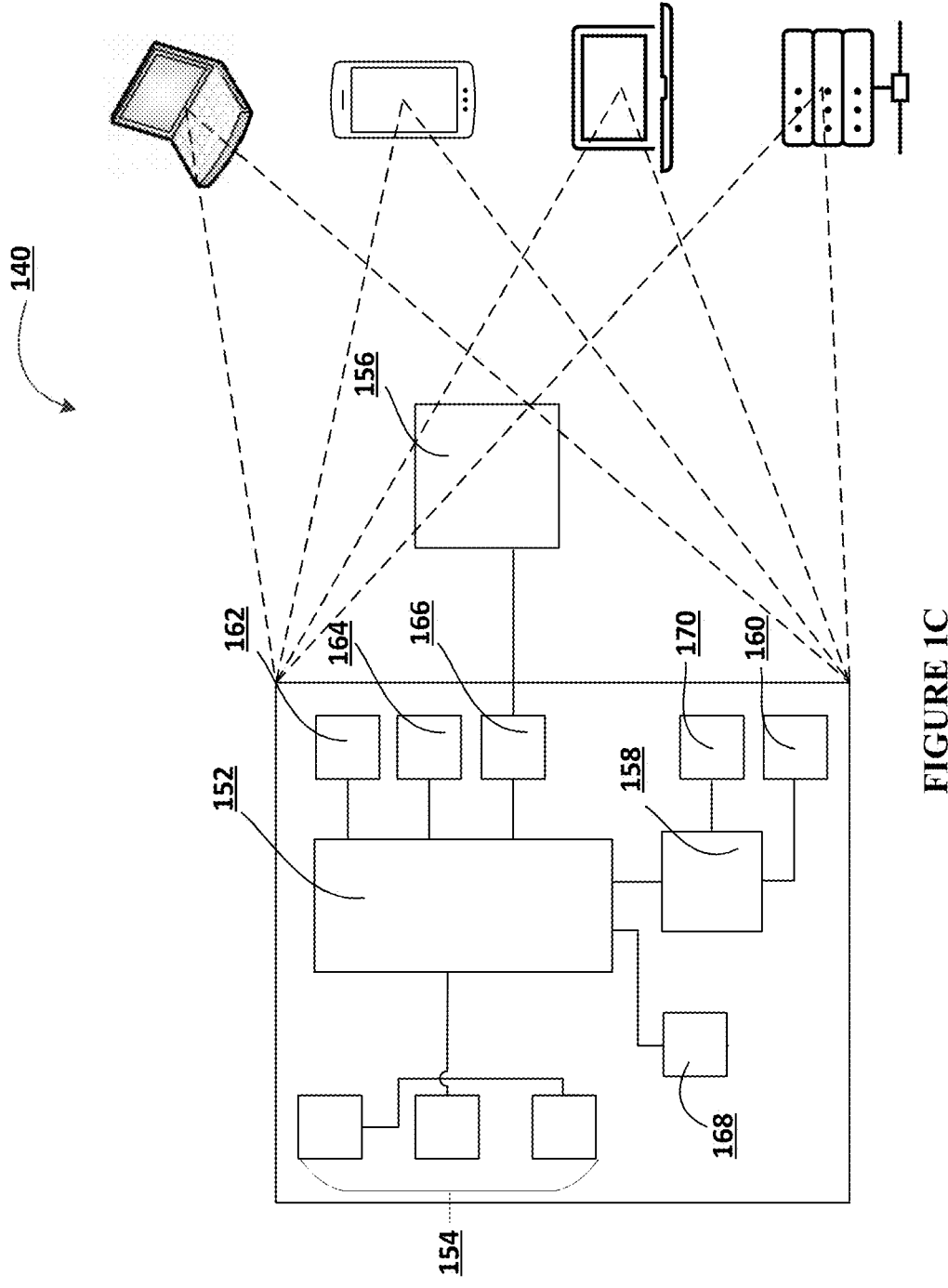
Figure 3:
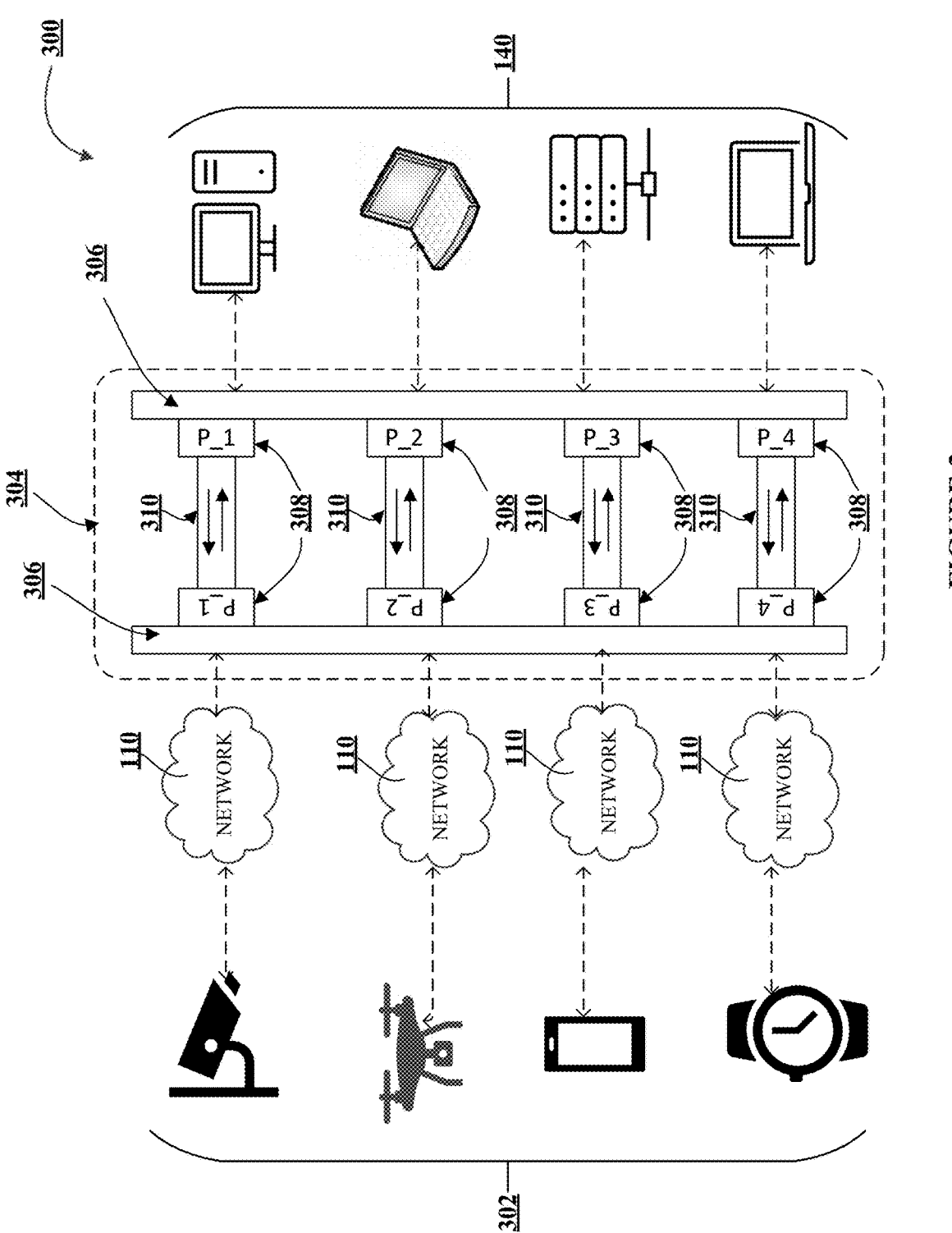
Figure 4:
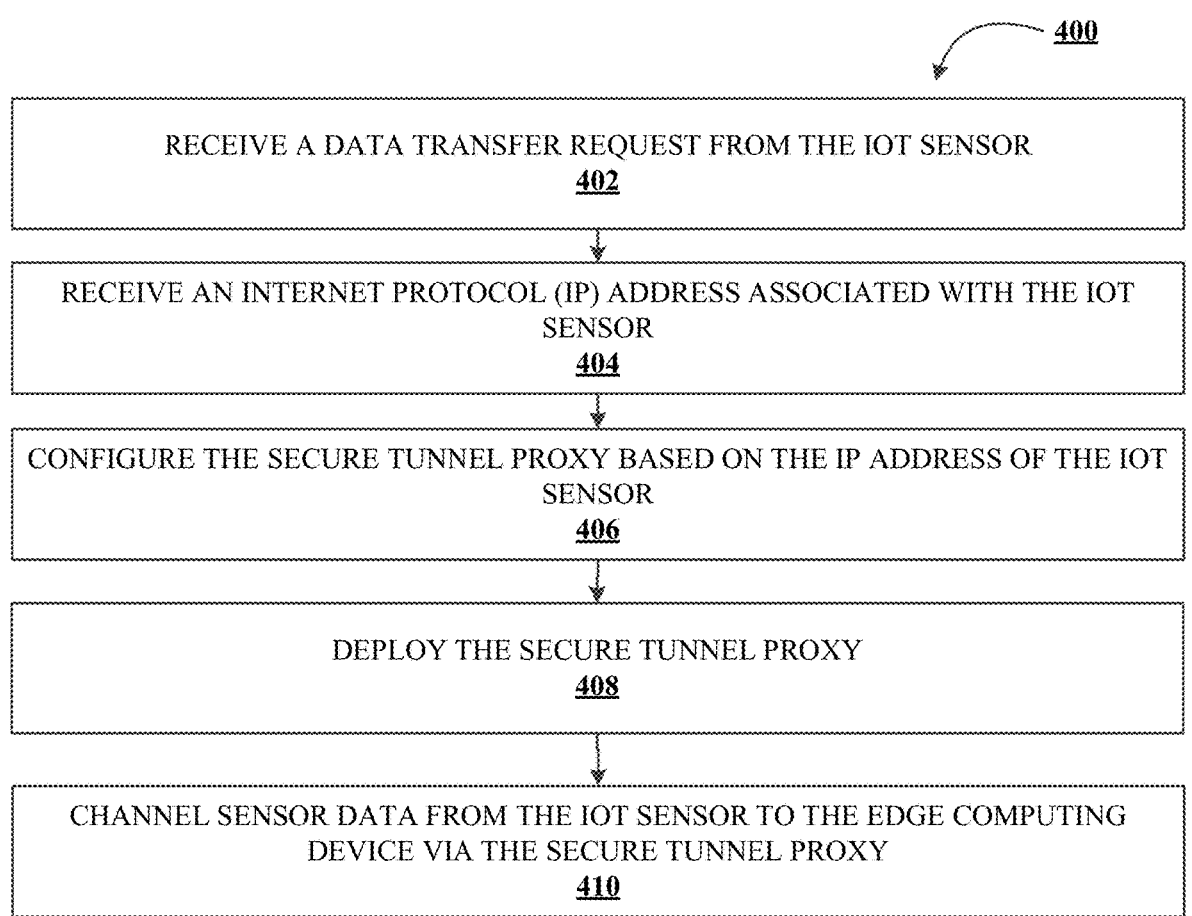

FIGS. 1A-1C illustrates technical components of an exemplary distributed computing environment for a secure tunnel proxy with software-defined perimeter for network data transfer, in accordance with an embodiment of the disclosure;

FIG. 2 illustrates a process flow for a secure tunnel proxy with software-defined perimeter for network data transfer, in accordance with an embodiment of the disclosure;

FIG. 3 illustrates an example secure tunnel proxy between IoT devices and edge computing devices, in accordance with an embodiment of the disclosure; and FIG. 4 illustrates a process flow for network data transfer using secure tunnel proxy, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Navigating the vast and complex world of data management from Internet of Things (IoT) devices (e.g., IoT sensors) can be a daunting task. As an ever-growing number of such devices are integrated into large network environments, they continually generate a substantial volume of data. This data is crucial as it supports various vital applications and analytics, playing a significant role in the digital ecosystem. Embodiments of the present invention establish a secure tunnel proxy with software-defined perimeter to facilitate the transfer of data between an IoT device and an edge computing device. By establishing a secure tunnel proxy with software-defined perimeter for network data transfer, the present invention enhances data security. The primary function of a secure tunnel proxy is to provide encryption for data in transit. Even if the data is intercepted during transmission, it would be extremely difficult for an unauthorized party to decipher the information. Encryption thus maintains the confidentiality and integrity of data. In addition, secure tunnel proxies use cryptographic keys for authentication, ensuring that the data is being sent and received by the correct devices. Doing so, prevents potential attackers from impersonating a device within the network. By encrypting the data and using integrity checks, the secure tunnel proxy ensures that the data has not been tampered with during transmission. Furthermore, using secure tunnel proxies to facilitate data transfers between IoT sensors and their corresponding edge computing devices can help maintain system performance, as systems that suffer breaches can experience significant slowdowns or even complete shutdowns. In summary, a secure tunnel proxy provides an additional layer of security, ensuring that the data collected from the sensors is securely transmitted to the edge devices for processing. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for a secure tunnel proxy with software-defined perimeter for network data transfer 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s)

140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including edge computing devices such as routers, routing switches, integrated access devices (IAD), and/or the like, user input devices such as personal digital assistants, cellular telephones, smartphones, laptops, desktops, and/or the like, merchant input devices such as point-of-sale (POS) devices, electronic payment kiosks, and/or the like, and/or electronic telecommunications device (e.g., automated teller machine (ATM)).

The network 110 may be a distributed network (e.g., IoT network technology) that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology. In example embodiments, the type of network 110 used herein may depend on various factors such as range, power consumption, bandwidth, and the specific application. Examples of such networks may include Wi-Fi, Bluetooth, Zigbee and Z-wave, Long Range Wide Area Network (LoRaWAN), Cellular (4G, 5G, NB-IoT, LTE-M), Thread, Sigfox, and/or the like.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be imple-mented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for a secure tunnel proxy with software-defined perimeter for network data transfer 200, in accordance with an embodiment of the disclosure. As shown in block 202, the process flow includes receiving sensor configuration information associated with an Internet of Things (IoT) sensor. In some embodiments, an IoT sensor may be a device that collects and sends data from its environment to other edge computing devices (e.g., end-point device 130) over a network (e.g., network 110). IoT sensors may be embedded in physical devices and can include a wide range of types, including, motion sensors, moisture sensors, air quality sensors, light sensors, and/or the like.

In some embodiments, sensor configuration information may refer to the set of customizable settings that control the operation and behavior of IoT sensors. In one aspect, the sensor configuration information may be specific to the sensor type and application. In example embodiments, the sensor configuration information may include a device identification-unique identifier of the IoT sensor within the network, network parameters-settings related to the IoT sensor's network connection, such as IP address, port number, SSID for Wi-Fi networks, and other connectivity details, security settings-settings necessary to maintain secure communication between the sensor and the IoT network, such as encryption keys, certificates, and authentication credentials, sampling rate-how often the sensor collects data, power management-setting related to power management for increased battery life such as sleep intervals, power saving modes, and/or the like, data transmission interval-how often the sensor transmits the collected data to the network, threshold values-condition triggering alerts or actions when met, calibration settings-ensuring accurate data measurement, such as offset values, scale factors, calibration curves, and/or the like, firmware information-version of the sensor's firmware and settings related to firmware updates, and/or the like.

As shown in block 204, the process flow includes receiving information associated with an edge computing device configured to receive sensor data from the IoT sensor. In example embodiments, the IoT sensor may be configured to continuously monitor its environment and collect data based on its specific function. For example, a motion sensor detects movement in its vicinity. Depending on the IoT sensor configuration, the IoT sensor may perform some preliminary processing on the collected data, including noise removal, data conversion and normalization, data compression, and/or the like. Then, the IoT sensor may transmit the data via a network (e.g., Wi-Fi, Bluetooth, Zigbee, LoRaWAN, cellular networks, and/or the like) to a specific address, such as the IP address of the designated edge computing device. The address may include an IP address, a MAC address, or some other type of identifier, depending on the network and protocols in use. As described herein, an edge computing device may be an end-point device that facilitates the principles of edge computing, which involves processing data closer to its source rather than relying on a centralized location, like a cloud data center, thereby reducing latency, enhancing privacy and security, and handling data processing tasks locally to alleviate bandwidth usage.

In some embodiments, information associated with an edge computing device may include device information— unique identifiers for the device (e.g., a MAC address or device ID), device type, model, manufacturer, hardware specifications (e.g., CPU, memory, storage), firmware version, and/or the like, network information—information about the network interfaces on the device, including IP addresses, service set identifiers (SSIDs) for Wi-Fi networks, network protocols supported, port numbers, connection status, and/or like, operational status-current status of the device, such as whether it's online or offline, its CPU and memory usage, power status, uptime, any errors or alerts, and/or the like, security information-security features, like encryption capabilities, firewall rules, installed security certificates, authentication methods, and/or the like, configuration settings—settings that determine how the device operates, including its network settings, power management settings, any device-specific settings like sampling rates for sensors or quality settings for video streams, and/or the like, location data, application and services information—information associated with the applications or services running on the edge device, their statuses, configurations, and/or the like, data analytics-outputs of the edge device, including sensor readings, log files, processed data, analytics, and any other data produced by the device and/or the like.

As shown in block 206, the process flow includes configuring a secure tunnel proxy between the IoT sensor and the edge computing device based on at least the sensor configuration information and the information associated with the edge computing device. In some embodiments, to configure secure tunnel proxy, the process flow may include identifying a secure protocol for data transfer, generating cryptographic keys, assigning ports for the IoT sensor and the edge computing device for data transfer therebetween, and establishing a proxy server for the ports to enhance the security, integrity, and control of the data transfer. Each step involved in configuring the secure tunnel proxy may be based on the sensor configuration information of the IoT sensor and the information associated with the edge computing device.

In an example embodiment, to establish a secure tunnel, the process flow may include selecting a secure protocol suitable for the data transfer (e.g., IPsec, SSL/TLS, DTLS, and/or the like). In response to selecting the protocol, the process flow may include generating a pair of cryptographic keys for the IoT sensor and the edge computing device, a public and a private one, to facilitate encryption and decryption of the data. Next, the process flow may include assigning network ports, identified by a corresponding port number, to the IoT sensor and the edge computing device. For example, the process flow may include assigning a first network port (identified by a first port number) to the edge computing device and a second network port (identified by a second port number) to the IoT sensor. The ports may provide specific entry and exit points for the data traffic. In doing so, the process flow may include configuring a secure tunnel between the IoT sensor and the edge computing device using the first network port and the second network port. In some embodiments, in addition to assigning network ports, the process flow may include assigning a proxy server to the ports to act as an intermediary by specifying the network ports (e.g., first network port and second network port) for the proxy server to "listen to," thereby configuring the secure tunnel proxy between the IoT sensor and the edge computing device. In one aspect, the process flow may include dynamically re-assigning a proxy for the first network port and the proxy for the second network periodically for enhanced security, load balancing, fault tolerance, geographic optimization, improved privacy, and scalability.

As shown in block 210, the process flow may include deploying the secure tunnel proxy between the IoT sensor and the edge computing device. In some embodiments, deploying the secure tunnel proxy may include configuring the IoT sensor to transmit data to the edge computing device via the secure tunnel proxy.

FIG. 3 illustrates an example secure tunnel proxy between IoT devices and edge computing devices 300, in accordance with an embodiment of the disclosure. As shown in FIG. 3, the secure tunnel proxy 304 may be deployed between the IoT sensors 302 and the end-point devices 140 (e.g., edge computing devices). The secure tunnel proxy 304 may include firewalls 306, network ports 308, and secure tunnel proxies 310 between the network ports 308. In some embodiments, the firewalls 306 may be used to maintain security and control the network traffic by allowing, denying, and/or redirecting data packets based on predetermined security rules. Specifically, the firewalls 106 may be configured to allow only specific IoT devices to establish a secure tunnel, effectively controlling which devices have access to the network and the edge computing devices. In addition, the firewalls 106 may be used to protect the secure tunnel proxy 304 by blocking unsolicited incoming traffic from the network 110 (e.g., Internet), thus preventing threats directed at the proxy. Furthermore, the firewalls 106 may scrutinize the incoming and outgoing data packets based on specific ruleset, thus preventing unauthorized access and detect anomalies that might indicate a threat, such as a denial-of-service (DOS) attack or an attempt to inject malicious data. In some cases, the firewalls 106 may be used to monitor network traffic for malicious activities and can block or alert administrators about potential threats. Lastly, the firewalls 106 may be used to track and log network activity for understanding and improving overall system performance.

The IoT sensors 302 may collect data from their environment and convert the data into a digital format that is suitable for communication via the corresponding network 110. The data may undergo a series of pre-processing, such as data compression prior to transmission. The data may then be encrypted using a pre-configured secure protocol and cryptographic keys. The encrypted data is then transmitted to a corresponding end-point device 140 via the network 110 and the secure tunnel proxy 304. In example embodiments, upon reaching the edge computing device, the data may be decrypted using appropriate cryptographic keys, and finally, processed. Processing the data may involve running the data through AI models, storing it for future use, forwarding it to another location (e.g., databases, cloud environment, and/or the like) for further processing or analysis.

FIG. 4 illustrates a process flow for network data transfer using secure tunnel proxy 400, in accordance with an embodiment of the disclosure. As shown in block 402, the process flow includes receiving a data transfer request from the IoT sensor. As shown in block 404, the process flow includes receiving an IP address (or equivalent identifiable information) associated with the IoT sensor. As shown in block 406, the process flow includes configuring the secure tunnel proxy based on the IP address of the IoT sensor. As shown in block 408, the process flow includes deploying the secure tunnel proxy. As shown in block 410, the process flow includes channeling sensor data from the IoT sensor to the edge computing device via the secure tunnel proxy.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for a secure tunnel proxy with software-defined perimeter for network data transfer, the system comprising:
   a processing device;
   a non-transitory storage device containing instructions when executed by the processing device, causes the processing device to:
   receive sensor configuration information associated with an Internet of Things (IOT) sensor;
   receive information associated with an edge computing device configured to receive sensor data from the IoT sensor;
   configure a secure tunnel proxy between the IoT sensor and the edge computing device based on at least the sensor configuration information and the information associated with the edge computing device, wherein configuring further comprises:
   assigning a first network port to the edge computing device;
   assigning a second network port to the IoT sensor; and
   configuring the secure tunnel between the IoT sensor and the edge computing device using the first network port and the second network port;
   deploy the secure tunnel proxy between the IoT sensor and the edge computing device; and
   channel sensor data from the IoT sensor to the edge computing device via the secure tunnel proxy.

2. The system of claim 1, wherein the first network port is identified using a first port number, and the second network port is identified using a second port number.

3. The system of claim 1, wherein executing the instructions further causes the processing device to:
   assign a proxy for the first network port and a proxy for the second network port; and
   configure the secure tunnel proxy using the proxy for the first network port and the proxy for the second network port.

4. The system of claim 3, wherein executing the instructions further causes the processing device to:
   dynamically re-assign the proxy for the first network port and the proxy for the second network periodically.

5. The system of claim 1, wherein executing the instructions further causes the processing device to:
   receive a data transfer request from the IoT sensor;
   receive an Internet Protocol (IP) address associated with the IoT sensor;
   configure the secure tunnel proxy based on the IP address of the IoT sensor; and
   deploy the secure tunnel proxy.

6. The system of claim 1, wherein the sensor configuration information comprises a device identification, network parameters, security settings, sampling rate, power management, data transmission interval, threshold values, calibration settings, and/or firmware information.

7. The system of claim 1, wherein the information associated with the edge computing device comprises device information, network information, operational status, security information, configuration settings, location data, application and services information, and data analytics.

8. A computer program product for a secure tunnel proxy with software-defined perimeter for network data transfer, the computer program product comprising a non-transitory computer-readable medium comprising code causing an apparatus to:
   receive sensor configuration information associated with an Internet of Things (IoT) sensor;

receive information associated with an edge computing device configured to receive sensor data from the IoT sensor;

configure a secure tunnel proxy between the IoT sensor and the edge computing device based on at least the sensor configuration information and the information associated with the edge computing device, wherein configuring further comprises:

assigning a first network port to the edge computing device;

assigning a second network port to the IoT sensor; and configuring the secure tunnel between the IoT sensor and the edge computing device using the first network port and the second network port;

deploy the secure tunnel proxy between the IoT sensor and the edge computing device; and channel sensor data from the IoT sensor to the edge computing device via the secure tunnel proxy.

9. The computer program product of claim 8, wherein the first network port is identified using a first port number, and the second network port is identified using a second port number.

10. The computer program product of claim 8, wherein the code further causes the apparatus to:

assign a proxy for the first network port and a proxy for the second network port; and configure the secure tunnel proxy using the proxy for the first network port and the proxy for the second network port.

11. The computer program product of claim 10, wherein the code further causes the apparatus to:

dynamically re-assign the proxy for the first network port and the proxy for the second network periodically.

12. The computer program product of claim 8, wherein the code further causes the apparatus to:

receive a data transfer request from the IoT sensor;

receive an Internet Protocol (IP) address associated with the IoT sensor;

configure the secure tunnel proxy based on the IP address of the IoT sensor; and deploy the secure tunnel proxy.

13. The computer program product of claim 8, wherein the sensor configuration information comprises a device identification, network parameters, security settings, sampling rate, power management, data transmission interval, threshold values, calibration settings, and/or firmware information.

14. The computer program product of claim 8, wherein the information associated with the edge computing device comprises device information, network information, operational status, security information, configuration settings, location data, application and services information, and data analytics.

15. A method for a secure tunnel proxy with software-defined perimeter for network data transfer, the method comprising:

receiving sensor configuration information associated with an Internet of Things (IoT) sensor;

receiving information associated with an edge computing device configured to receive sensor data from the IoT sensor;

configuring a secure tunnel proxy between the IoT sensor and the edge computing device based on at least the sensor configuration information and the information associated with the edge computing device, wherein configuring further comprises:

assigning a first network port to the edge computing device;

assigning a second network port to the IoT sensor; and configuring the secure tunnel between the IoT sensor and the edge computing device using the first network port and the second network port;

deploying the secure tunnel proxy between the IoT sensor and the edge computing device; and channeling sensor data from the IoT sensor to the edge computing device via the secure tunnel proxy.

16. The method of claim 15, wherein the first network port is identified using a first port number, and the second network port is identified using a second port number.

17. The method of claim 15, wherein the method further comprises:

assigning a proxy for the first network port and a proxy for the second network port; and configuring the secure tunnel proxy using the proxy for the first network port and the proxy for the second network port.

* * * * *